United States Patent [19]
Allen

[11] Patent Number: 4,496,224
[45] Date of Patent: * Jan. 29, 1985

[54] EYEGLASS FRAME WITH POCKET CLIP

[76] Inventor: Charles B. Allen, 5 Briarfield La., Huntington, N.Y. 11743

[*] Notice: The portion of the term of this patent subsequent to Feb. 23, 1999 has been disclaimed.

[21] Appl. No.: 426,696
[22] Filed: Sep. 29, 1982
[51] Int. Cl.³ .............................. G02C 3/00
[52] U.S. Cl. .................. 351/155; 351/112; 351/158
[58] Field of Search .......... 351/51, 59, 112, 158, 351/155

[56] References Cited
U.S. PATENT DOCUMENTS
3,531,188  9/1970  Leblanc et al. ............ 351/59

Primary Examiner—Rodney B. Bovernick
Assistant Examiner—Paul Dzierzynski
Attorney, Agent, or Firm—Collard, Roe & Galgano

[57] ABSTRACT

An improved frame for eyeglasses includes a pair of interconnected rims, each of which is configured to surround and support an eyeglass lens and at least one clasp resiliently secured to the rim and superimposed over at least about ⅓ of the outer surface of one of the rims. The clasp is configured and dimensioned to correspond to the configuration and width of the portion of the outer surface of the rim over which it is superimposed. The clasp is also generally spaced above this portion of the rim outer surface to permit a portion of a user's garment to be inserted between the clasp and the rim. The clasp serves to releasably secure the eyeglass frame to a user's garment inserted between the rim and the clasp.

10 Claims, 5 Drawing Figures

U.S. Patent  Jan. 29, 1985  4,496,224
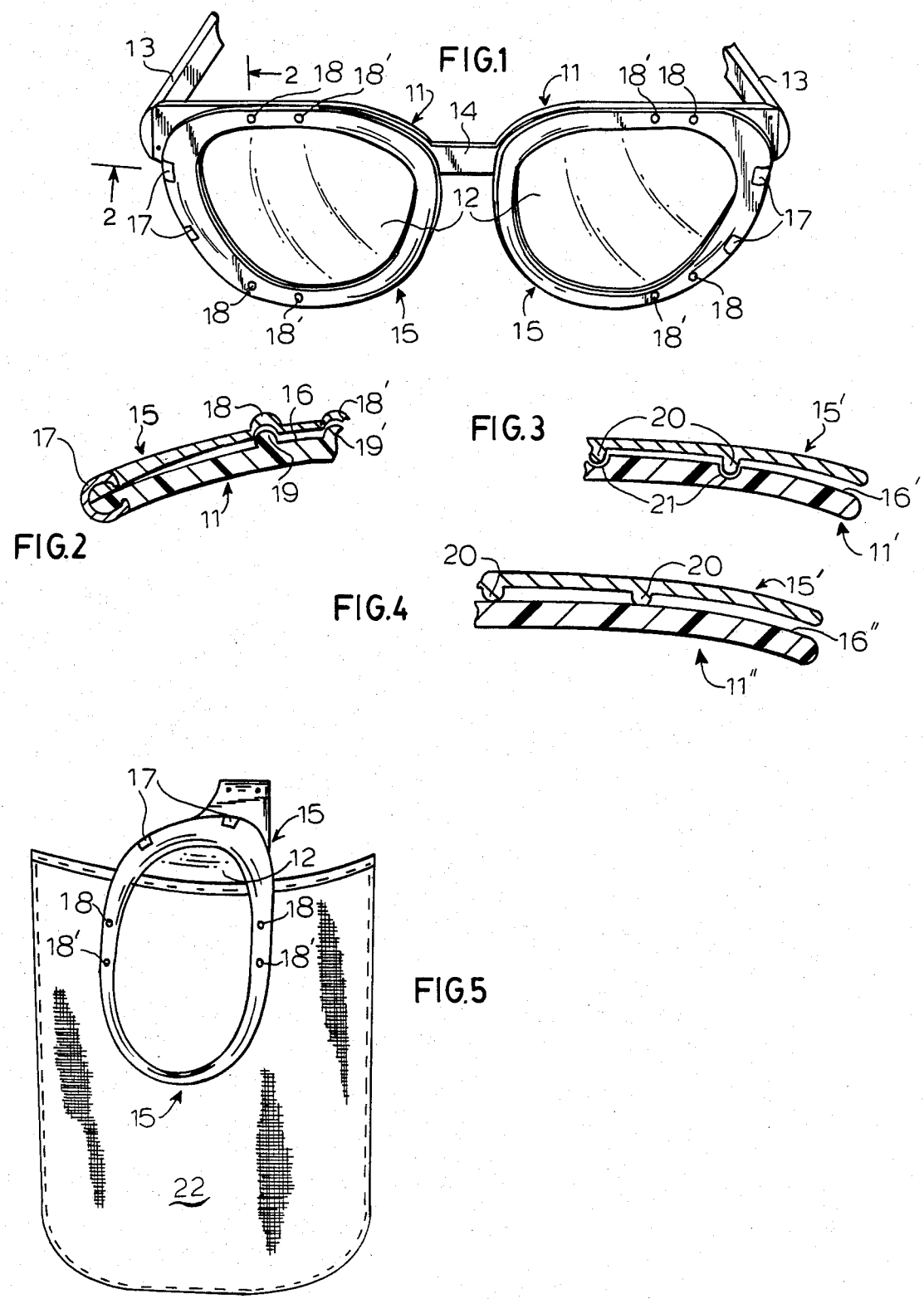

EYEGLASS FRAME WITH POCKET CLIP

The present invention relates to an improved frame for eyeglasses or sunglasses. More particularly, it relates to an eyeglass frame provided with means for releasably adhering the eyeglasses to a pocket or other portion of an eyeglass wearer's garment when not in use so as to avoid the possibility of the glasses being dropped and broken.

Various types of eyeglass frames are, of course, well known in the art. It has been previously proposed to provide eyeglass frames with clasps mounted adjacent to the temple bars or sidepieces which extend rearwardly beyond and above the ears to enable the eyeglasses to be safely carried within the pocket of the user (see, e.g., U.S. Pat. Nos. 2,042,400 and 2,097,371).

While it would appear that such types of clasps are generally satisfactory, they do have the disadvantage that they are not suitable for shallow pockets. In addition, they do not permit secure and facile fastening to a pocketless, button-down shirt. Furthermore, they add additional and quite noticeable hardware to the eyeglass frame which can be considered aesthetically unpleasing.

In the patentee's prior U.S. Pat. No. 4,316,654 (the subject matter of which is incorporated herein by reference thereto), an improved frame for eyeglasses is disclosed which overcomes these disadvantages. The present invention affords a further and improved embodiment of this type of frame.

It is therefore an object of the present invention to provide a novel improved frame for eyeglasses having means for releasably adhering the eyeglasses to a pocket or other portion of a user's garment.

It is also an object of the present invention to provide such a novel eyeglass frame which is relatively simple in design, reliable, effective, easy to use, and economical to manufacture.

It is a more particular object of the present invention to provide a novel improved eyeglass frame having the foregoing attributes and characteristics which is both functional and aesthetically pleasing.

Certain of the foregoing and related objects are attained in accordance with the present invention by the provision of an improved frame for eyeglasses which includes a pair of interconnected rims, each of which has an outer surface and is configured to surround and support an eyeglass lens and at least one clasp resiliently mounted on one of the rims and superimposed over at least about one-third and, preferably all of the outer surface of one of the rims. The clasp is configured and dimensioned to correspond to the configuration and width of the portion of the outer surface over which it is superimposed and it is generally spaced above the outer surface to permit a portion of a user's garment to be inserted between the clasp and the rim. The clasp has means cooperating therewith for releasably securing the frame to a user's garment inserted between the rim and the clasp.

Most advantageously, the clasp is secured to the rim by at least one spring element. The spring element preferably has a generally U-shaped profile and is composed of a base section and two arms which resiliently grasp therebetween the central segment of the clasp and the distal side segment of the rim. Most desirably, the central segment of the clasp has a hole formed in the outer surface thereof and the distal side segment of said rim has a hole formed in the inner surface therof, and the arms of the spring element each have an inwardly extending flange at the free ends thereof, which is dimensioned for snap-fit receipt in the corresponding holes of the clasp and rim, respectively.

In a particularly advantageous embodiment, the central segment of the clasp and the distal side segment of the rim each has a groove formed therein for seating receipt of the spring element. Most desirably, the clasp is resiliently secured to said rim by means of at least two spaced-apart spring elements.

It is desirable that the clasp have a pair of opposite arms or segments which resiliently engage the outer surface of the rim; the arms in cooperation with the opposing contacting portions of the outer surface of the rim defining the aforementioned means for releasably securing the garment between the clasp and the rim, although such is assisted by the spring-loaded mounting of the clasp itself.

In one preferred embodiment of the invention, the arms of the clasp each have at least one protuberance formed on the underside thereof which resiliently engages the outer surface of the associated rim. Most desirably, the outer surface of the rim is provided with complementary-configured and positioned dimples for at least the partial receipt therein of the protuberances.

In a particularly preferred embodiment, the rim has at least a pair of protuberances formed on the outer surface thereof and the clasp arms each have at least one complementary-configured and positioned dimple formed on the underside thereof for at least the partial receipt therein of one of the protuberances. It is further advantageous if the arms each have at least two spaced-apart dimples formed on the underside thereof adjacent to the ends of the arms. Finally, it is also desirable that the frame has a pair of clasps, each of which is associated with one of the rims.

Other objects and features of the present invention will become apparent from the following detailed description, considered in connection with the accompanying drawing, which discloses several embodiments of the invention. It is to be understood, however, that the drawing is designed for the purpose of illustration only, and not as a definition of the limits of the invention.

In the drawing, wherein similar reference characters denote similar elements throughout the several views:

FIG. 1 is a fragmentarily-illustrated, perspective view of an improved frame for eyeglasses embodying the present invention;

FIG. 2 is a fragmentarily-illustrated, enlarged elongated sectional view taken along line 2—2 of FIG. 1;

FIG. 3 is a fragmentarily-illustrated, enlarged view generally comparable to that of FIG. 2, but showing an alternate embodiment of the invention;

FIG. 4 is a fragmentarily-illustrated, enlarged sectional view generally similar to that of FIGS. 2 and 3, but showing a further embodiment of the invention; and FIG. 5 is a front elevational view showing the eyeglasses mounted in a user's pocket.

Turning now in particular to FIG. 1, therein illustrated is a novel eyeglass frame embodying the present invention which includes a generally conventional eyeglass frame consisting of a pair of rims 11, each of which is configured to support and surround an eyeglass lens 12. Each rim is pivotably connected to a temple bar or sidepiece 13 which is intended to extend rearwardly beyond and above the wearer's ear, when unfolded. Rims 11 are interconnected by a bridge member 14.

A pair of relatively thin, resilient clasps 15, each of which has the same configuration as the rims 11 are each resiliently mounted on the outer surface 16 of one of the rims 11. This is preferably effected by means of a pair of upper and lower, preferably generally U-shaped, spring elements 17.

As shown best in FIG. 2, spring elements 17 each comprise a base section having two arms which cooperate to resiliently and securely grasp therebetween an edge portion of the clasp 15 and the corresponding edge portion of the rim 11. Spring elements 17 are preferably provided with turned-in flanges at their free ends which are designed for resilient snap-fit engagement in corresponding holes formed in clasp 15 and rim 11; note also that the rim edge portions of the clasp and rim are also correspondingly grooved to permit a flush, smooth contour, relative to the remainder of clasp 15 and rim 11.

Although not illustrated, thin staple-like spring elements could be used instead of the wider ones illustrated. For example, two thin spaced-apart resilient-like spring elements or staples could replace each of the spring elements shown in the figures at the same respective locations.

Clasps 15 are each configured and dimensioned to correspond to the configuration and width of the portion of the outer surface 16 over which they are superimposed. Clasps 15 typically extend over at least about one-third of the outer surface of the associated rim, although it is preferable that they extend over the entire outer surface of the rims for aesthetic reasons.

Clasps 15 are generally spaced above outer surface 16 of its associated rim 11 to permit a portion of a user's garment 22 to be inserted therebetween. To facilitate ready but releasable securement of the portion of the garment 22 between clasps 15 and rims 11, clasps 15 are each provided with a pair of spaced-apart dimples 18, 18'. The outer surface 16 of the associated rims 11 are correspondingly provided with a pair of complementary-configured and positioned spaced-apart protuberances 19, 19' on both the upper and lower rim portions thereof which are at least partially receivably in dimples 18 and 18', respectively, so as to effect resilient engagement between clasps 15 and rims 11 (see FIG. 2).

In an alternate embodiment as shown in FIG. 3, protuberances 20 are provided on the underside of the clasp 15' and the dimples 21 are formed in the outer surface 16' of rim 11'. In yet a further embodiment shown in FIG. 4, clasp 15' is again provided with protuberances 20 on the underside thereof, but in this case, no corresponding dimples are formed in the outer surface 16'' of the rim 11''.

Regardless of whether the protuberances are used either alone or in combination with the dimples, resilient engagement is effected between the clasp 15, 15' and the eyeglass rim 11, 11', 11'' so that when a portion of the user's garment 22 is inserted therebetween, the eyeglass frame will be securely, although releasably, fastened to the garment. In this regard, it should be noted that the resilient mounting of clasps 15 by at least one spring element 17 may possibly be sufficient for effecting such a resilient grip on the user's garment, although obviously the use of such protuberances would significantly increase its gripping power.

In FIG. 5, the eyeglass frame is shown secured in the pocket 22 of a garment. Due to the fact that there are four contact points (i.e., 18-19 and 18'-19' for each arm of clasp 15), the eyeglass frame is held securely in the pocket. Furthermore, it should be pointed out that due to the fact that clasps 15 extend over the entire rim 11, clasps 15 will be functional even in shallow pockets since the outermost dimples 19' and protuberances 18' should at least engage a portion of the pocket, even though the innermost cooperating pairs of dimples 19 and protuberances 18 might not. Of course, it should also be realized that more than two corresponding sets or protuberances could be formed on the clasps so as to increase the points of contact. It should also be appreciated that due to the fact that each rim is provided with a clasp, the glasses may be inserted into the pocket from either end of the frame.

It should also be realized that the configuration of the clasps will be dependent upon the type and shape of the eyeglass frames employed; the shape of the clasps conforming to the outer surface of the frame, relative to their shape and width so as not to obstruct the vision of the wearer. The size, shape and number of spring elements may also be varied. In addition, the length of the arms of the clasps are of course variable, as well as the materials from which the clasps are made, although typically the clasps will extend over the entire outer surface of the rims for aesthetic reasons and will be made from the same material as the frame on which they will be mounted, such as plastic, so that they blend unobtrusively into the frame and provide a more aesthetically acceptable configuration.

It should also be pointed out that the resilient mounting of the clasps 15 on rims 11 may also be performed by other methods, e.g., by integrally molding the clasps with the rims to produce such a resilient mounting. In such a case, an integral, resilient "bridge" would be formed connecting the clasps to the rims. This "bridge" would preferably have a width equal to about the distance between the two spring elements 17 of the associated clasp.

It should also be pointed out that by the use of the inventive clasps on the eyeglass frame, the user is afforded a maximum freedom of movement without the hazard of the eyeglasses jouncing out of the pocket. In addition, it eliminates the unsightly bulge in the user's suitcoat or jacket caused by the use of thick leather or plastic eyeglass cases. Since these cases are no longer needed and since the eyeglass frame even with the clasps is still relatively flat, a trimmer, more normal appearance is obtained. Furthermore, if a vest is worn, the eyeglasses could probably be inserted into one of the small vest pockets. Usually, the thickness of the case has precluded this.

While only several embodiments of the invention have been shown and described, is will be obvious that many modifications and changes may be made thereunto, without departing from the spirit and scope of the invention.

What is claimed is:

1. An improved frame for eyeglasses, comprising:
   a pair of interconnected rims, each of which is configured to surround and support an eyeglass lens, said rims each having a top, bottom and two side segments which cooperatively define an outer surface; and
   at least one clasp superimposed over at least about ⅓ of the outer surface of one of said rims and resiliently secured to the side segment thereof which is distal to the other of said rims by means of at least one spring element, said clasp being configured and dimensioned to correspond to the configuration and width of the portion of the outer surface over which it is superimposed, said clasp having a central section which normally overlies said distal side segment and two arms extending from opposite ends of said central segment which normally overlie at least a portion of said top and bottom segments of the associated rim, said clasp also being generally spaced above said portion of said outer surface to permit a portion of a user's garment to be inserted between said clasp and said rim and so as to effect releasable securement of said frame to a user's garment so inserted therebetween.

2. The frame of claim 1, wherein said spring element has a generally U-shaped profile and is composed of a base section and two arms, which resiliently grasp therebetween said central segment of said clasp and said distal side segment of said rim.

3. The frame of claim 2, wherein said central segment of said clasp has a hole formed in the outer surface thereof and said distal side segment of said rim has a hole formed in the inner surface thereof, and wherein said arms of said spring element each have an inwardly extending flange at the free ends thereof, which is dimensioned for snap-fit receipt in said corresponding holes of said clasp and rim, respectively.

4. The frame of claim 3, wherein said central segment of said clasp and said distal size segment of said rim each have a groove formed therein for seating receipt of said spring element.

5. The frame of claim 1, wherein said clasp is resiliently secured to said rim by means of at least two spaced-apart spring elements, each of which has a generally U-shaped profile and is composed of a base section and two arms which resiliently grasp therebetween said central segment of said clasp and said distal side segment of said rim.

6. The frame of claim 1, wherein said frame has a pair of said clasps, each of which is associated with one of said rims.

7. The frame of claim 1, wherein said arms of said clasp have at least one protuberance formed on the underside thereof which resiliently engages the outer surface of said rim.

8. The frame of claim 7, wherein said outer surface of said rim has complementary-configured and positioned dimples for at least the partial receipt therein of said protuberances.

9. The frame of claim 1, wherein said rim has at least a pair of protuberances formed on the outer surface thereof and wherein said arms each have at least one complementary-configured and positioned dimple formed on the underside thereof for at least the partial receipt therein of one of said protuberances.

10. An improved frame for eyeglasses, comprising:
a pair of interconnected rims, each of which is configured to surround and support an eyeglass lens, said rims each having a top, bottom and two side segments which cooperatively define an outer surface; and
at least one clasp superimposed over the entire outer surface of one of said rims and resiliently secured to the side segment thereof which is distal to the other of said rims, said clasp being configured and dimensioned to correspond to the configuration and width of the portion of the outer surface over which it is superimposed, said clasp having corresponding top, bottom and two side segments which normally overlie said side segments and top and bottom segments of the associated rim, said clasp also being generally spaced above said portion of said outer surface to permit a portion of a user's garment to be inserted between said clasp and said rim and so as to effect releasable securement of said frame to a user's garment so inserted therebetween.

* * * * *